(12) United States Patent
Sekiguchi et al.

(10) Patent No.: US 6,611,628 B1
(45) Date of Patent: Aug. 26, 2003

(54) METHOD OF IMAGE FEATURE CODING AND METHOD OF IMAGE SEARCH

(75) Inventors: Shunichi Sekiguchi, Tokyo (JP); Yoshihisa Yamada, Tokyo (JP); James Chow, Tokyo (JP); Kohtaro Asai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/714,140

(22) Filed: Nov. 17, 2000

Related U.S. Application Data

(63) Continuation of application No. PCT/JP99/00403, filed on Jan. 29, 1999.

(51) Int. Cl.[7] .............................................. G06K 9/36
(52) U.S. Cl. ...................................................... 382/243
(58) Field of Search ................................. 382/166, 232, 382/236, 238, 239, 243; 348/716, 717, 587, 597, 592, 598, 399, 391.1, 393.1

(56) References Cited

U.S. PATENT DOCUMENTS

| | | | | |
|---|---|---|---|---|
| 5,619,338 A | * | 4/1997 | Nakai ........................... | 386/70 |
| 5,771,334 A | * | 6/1998 | Yamauchi et al. ............. | 386/95 |
| 5,867,221 A | * | 2/1999 | Pullen et al. .................. | 348/417 |
| 5,923,376 A | * | 7/1999 | Pullen et al. .................. | 348/417 |
| 5,966,352 A | * | 10/1999 | Sawabe et al. ................ | 369/32 |
| 5,974,172 A | * | 10/1999 | Chen ............................. | 382/166 |
| 6,037,982 A | * | 3/2000 | Coelho .......................... | 382/166 |
| 6,047,085 A | * | 4/2000 | Sato et al. ..................... | 382/166 |
| 6,122,400 A | * | 9/2000 | Reitmeier ...................... | 382/166 |
| 6,141,442 A | * | 10/2000 | Chen ............................. | 382/166 |
| 6,151,441 A | * | 11/2000 | Kawamura et al. ........... | 386/95 |
| 6,198,772 B1 | * | 3/2001 | Boice et al. ............. | 375/240.17 |
| 6,208,693 B1 | * | 3/2001 | Chen et al. ................... | 382/166 |
| 6,259,810 B1 | * | 7/2001 | Gill et al. ..................... | 382/166 |
| 6,385,336 B1 | * | 5/2002 | Jin ................................ | 382/166 |

OTHER PUBLICATIONS

Tanaka et al., Nikkei Electronics, No. 77, pp. 149–154, (1998).
Ono et al., Denshi Jouhou Tssushin Gakkai Rombunshi D–II, vol. J79, No. 4, pp. 476–483 (1996).
Miki, Application of MPEG–7, pp. 283–290 (1998).
Nagasak et al, Denshi Jouhou Tssushin Gakkai Rombunshi D–II, vol. J79, No. 4, pp. 531–537 (1996).
Alatan et al., IEEE, vol. 8, No. 7, pp. 802–813 (1998).

* cited by examiner

Primary Examiner—Jose L. Couso
(74) Attorney, Agent, or Firm—Birch, Stewart, Kolasch & Birch, LLP

(57) ABSTRACT

A feature coding unit extracts and encodes a feature of a video signal so as to generate a feature stream. A feature identifying unit checks a decoded feature obtained as a result of decoding the feature stream against a search key from a user for a match so that a video content requested by the user is retrieved.

7 Claims, 14 Drawing Sheets

SEGMENT(REPRESENTATIVE COLOR: RED, SIZE: 25%)

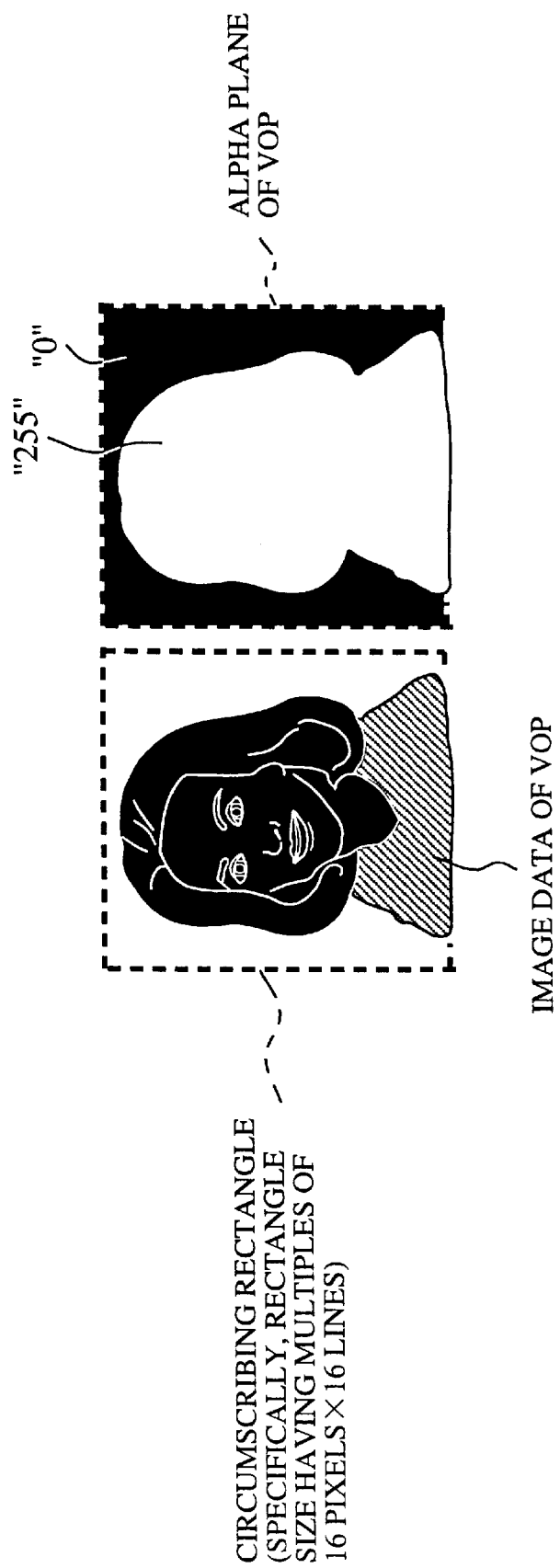

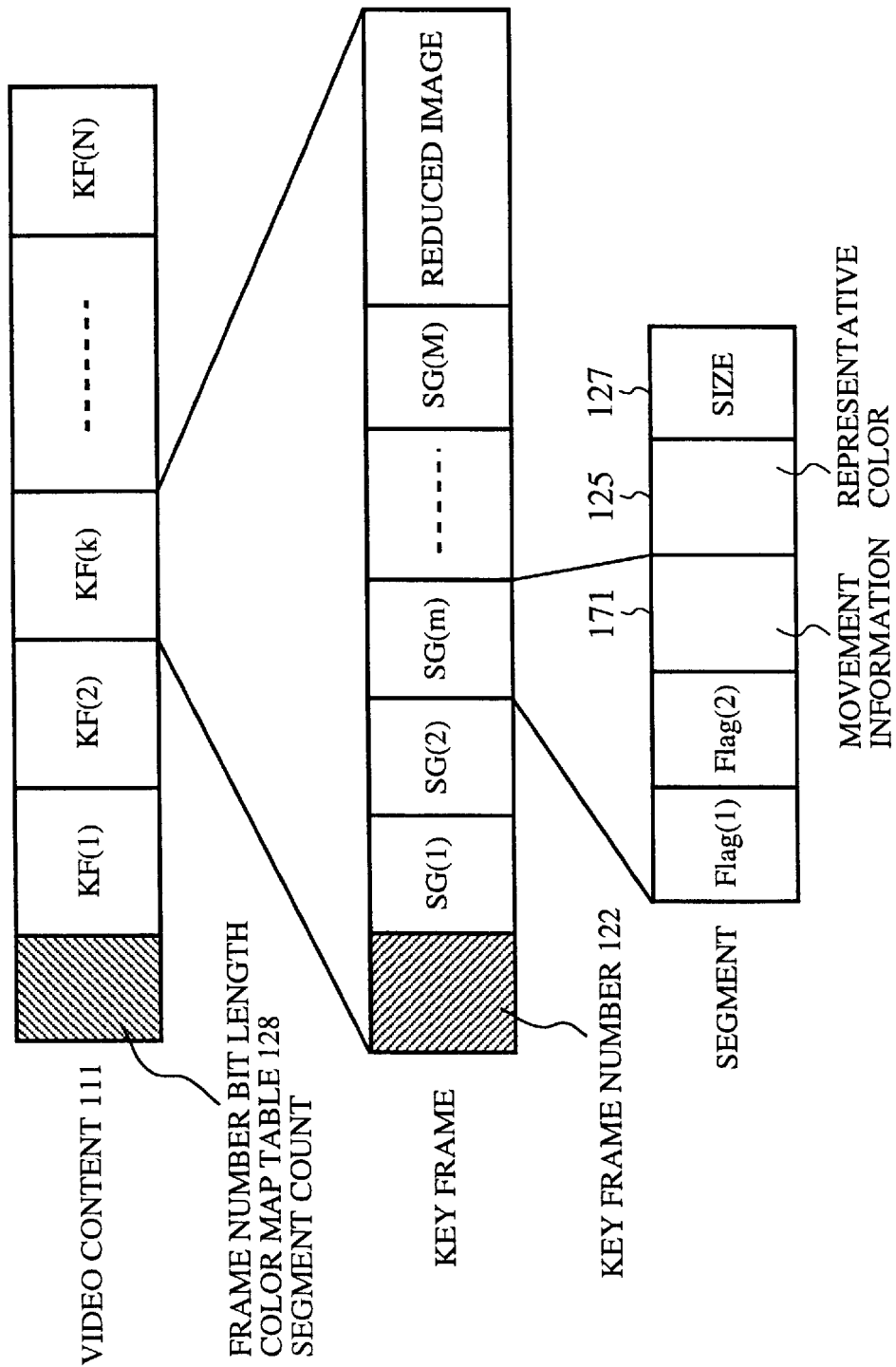

METHOD OF IMAGE FEATURE CODING AND METHOD OF IMAGE SEARCH

CROSS-REFERENCE TO THE RELATED APPLICATION

This Application is a continuation of International Application No. PCT/JP99/00403, whose International filing date is Jan. 29, 1999, the disclosures of which Application are incorporated by reference herein,

BACKGROUND OF THE INVENTION

1. Field of the Invention

The present invention generally relates to methods of image feature coding and image search and, more particularly, to a method of image feature coding and a method of image search in which features of analog or digital data of moving images or still images are extracted and coded so that the image data is searched using the coded feature.

2. Description of the Related Art

FIG. 1 is a block diagram showing a related-art image search system described in Denshi Jouhou Tsuushin Gakkai Rombunshi D-II Vol. 79-D-II No. 4, April, 1996, pp.476–483. Referring to FIG. 1, the system comprises a pre-processing unit 91 for segmenting a still image 201, attaching a keyword to each of the resulting segments and outputting a conceptual keyword 203 and a scene descriptive keyword 204; a search tool 92 for receiving a keyword 205 from a user 97 and retrieving the still image 201 by checking the input keyword against the conceptual keyword 203 and the scene descriptive keyword 204.

The conceptual keyword 203 is a keyword indicating color information and feature of a segment. The scene keyword 204 is a keyword representing a feature of the segment using descriptive words relating to position, color, shape, size and orientation.

The pre-processing unit 91 of FIG. 1 comprises a segmentation unit 93 for segmentation of the still image 201; a conceptual keyword extraction unit 94 for extracting the conceptual keyword 203 from the color and feature of the segment produced by the segmentation unit 93; and a scene descriptive keyword providing unit 95 for assigning the scene keyword 204 to the image feature of the segment produced by the segmentation unit 93, by receiving a predicate description 202 selected by a user 96 from a set of predefined predicates.

The search tool 92 of FIG. 1 comprises a feature identifying unit 98 for checking the keyword 205 selected by the user 97 against the conceptual keyword 203 and the scene descriptive keyword 204 from the pre-processing unit 91.

A description will now be given of the operation.

When the still image 201 is supplied to the pre-processing unit 91, the segmentation unit 93 segments the still image 201. The conceptual keyword extracting unit 94 extracts the conceptual keyword 203 from the color and feature of the segment. More specifically, the conceptual keyword extracting unit 94 starts with a conceptual keyword associated with the color information to arrive at the conceptual keyword 203.

The scene descriptive keyword providing unit 95 provides the scene keyword 204 to the image feature of the segment, by receiving the predicate description 202 from the user 96.

When searching for the still image 201, the user 97 inputs the keyword 205, selected from a prepared set of conceptual keywords 203 and scene keywords 204, to the search tool 92. The feature identifying unit 98 retrieves the still image 201 requested by the-user 97, based on the keyword 205 provided by the user 97, the conceptual keyword 203 and the scene descriptive keyword 204 from the preprocessing unit 91.

Since the target of the image search system described above is the still image 201, there is a drawback in that it is difficult to search for moving images.

In addition, since not much consideration is given to how the keywords are provided and stored, a one-to-one correspondence between an image server and a client (search tool 92) is a prerequisite. Therefore, according to the related art, an image search system where a large number of users are capable of searching for images using a variety of search tools via a network cannot be built.

SUMMARY OF THE INVENTION

Accordingly, a general object of the present invention is to provide a method of image feature coding and a method of image search in which the aforementioned drawbacks are eliminated.

Another and more specific object is to provide a method of image feature coding and a method of image search in which a large number of users can search for images using a variety of search tools.

The aforementioned objects can be achieved by an image feature coding method comprising the steps of: extracting segments of image areas from an image frame; attaching a segment number to each of the extracted segments; assigning a representative color to each of the extracted segments; computing a relative area of each of the segments with respect to the image frame; coding the representative color and the relative area to produce a feature of the image; and generating a feature stream corresponding to the image having the feature encoded therein.

The segments may be extracted from the image frame in accordance with color information, and the color information used in extracting the segments is assigned to the extracted segments as the representative color.

The segments from adjacent image frames may be checked for identity match, and those segments determined to match each other are given a same segment number.

The segments may be tracked from image frame to image frame so as to determine movement information relating to the segments that match each other.in identity, the movement information is generated by coding to produce the feature of the segments, and the feature stream, having the feature thus produced encoded therein, is generated.

An appropriate key frame that provides a key for a search is extracted from a group of image frames of a video signal, whereupon the segments are extracted from the extracted key frames.

A reduced image of the key frame may be generated by averaging pixels located in respective areas of the key frame, the reduced image is coded to produce the feature of the key frame, and the feature stream, having the feature thus produced encoded therein, is generated.

The aforementioned objects can also be achieved by an image searching method using first storage unit for storing image frames and a second storage unit for storing a feature stream having features of the image frames encoded therein, comprising the steps of: decoding the features stored in the second storage unit, in accordance with a search instruction from a user; and checking the decoded features against a search criteria provided by the user for identity match.

The features stored in the second storage unit may include a representative color of a segment constituting an area in the image frame, and the search criteria from the user may include the representative color.

The features stored in the second storage unit may include a relative area of a segment, constituting an area in the image frame, with respect to the image frame, and the search criteria from the user may include the relative area.

The features stored in the second storage unit may include movement information related movement between adjacent image frames, and the search criteria from the user may include the movement information.

The features stored in the second storage unit may include a reduced image of the image frame, the decoded feature may be checked against the search criteria from the user, and the reduced image may be presented to the user.

The features stored in the second storage unit may include information indicating whether a designated object is captured in the image frame.

The features stored in the second storage unit may include information indicating whether a designated object is captured subsequent image frames.

The features stored in the second storage unit may include information indicating whether a designated object is captured previous image frames.

Priority given to the decoded feature when checking the decoded feature against the search criteria from the user may be presented to the user.

A plurality of decoded features may be checked from an viewpoint against a plurality of search criteria from the user for a match from an overall perspective.

BRIEF DESCRIPTION OF THE DRAWINGS

Other objects and further features of the present invention will be apparent from the following detailed description when read in conjunction with the accompanying drawings, in which:

FIG. 11 shows an MPEG-4 video object plane (VOP);.

FIG. 17 shows a construction of the feature stream produced by the feature coding unit using the segment extraction unit of FIG. 16;

DETAILED DESCRIPTION OF THE PREFERRED EMBODIMENTS

A detailed description of the best mode of carrying out the present invention will now be given, with reference to the attached drawings.

First Embodiment

According to an apparatus of a first embodiment, a rectangular area surrounding an object contained in a frame of a video sequence is identified as a segment. Segments are extracted from each frame constituting a video signal. A feature stream identifying the features of the segments is generated.

Figure 2:
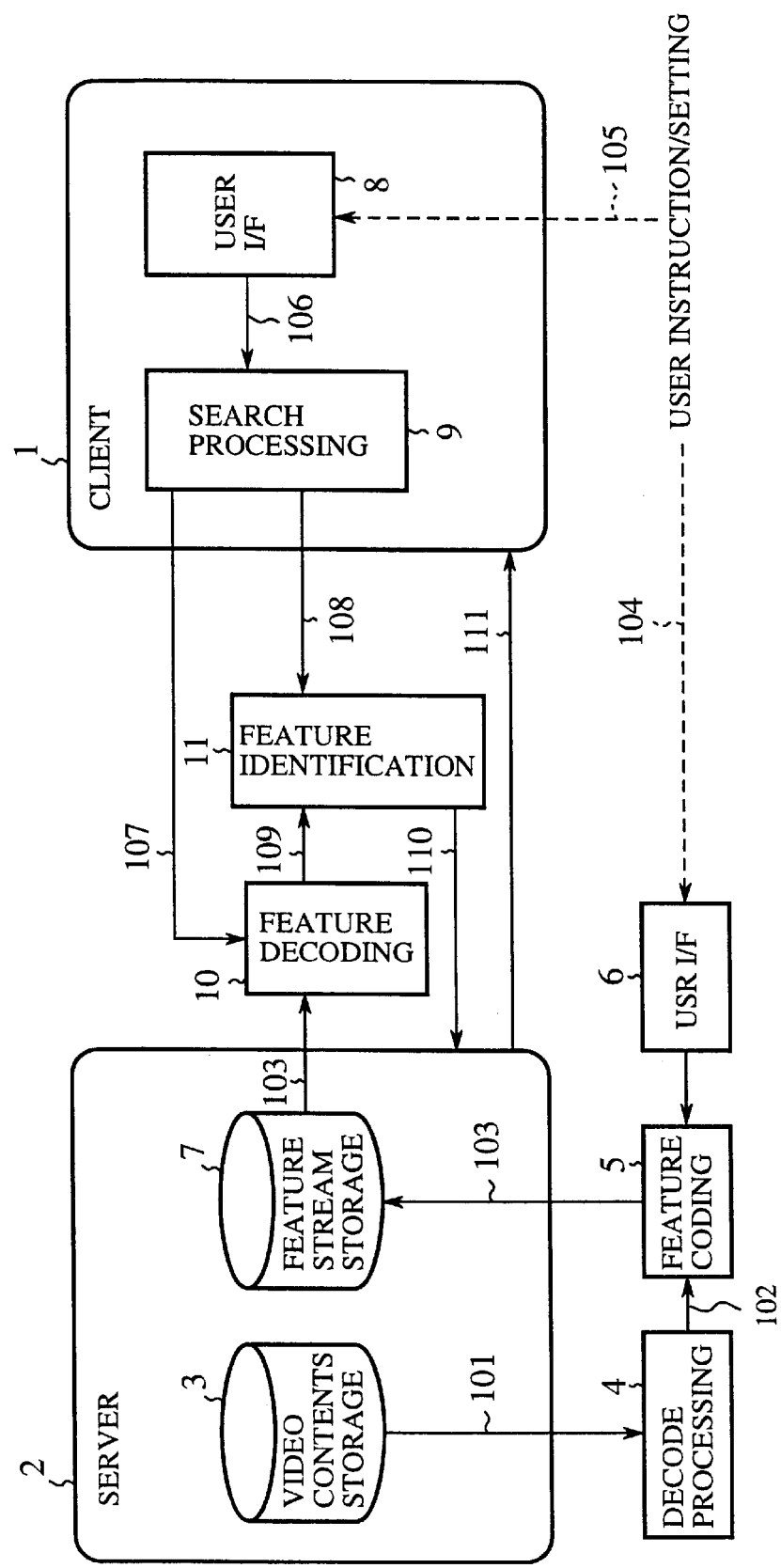
FIG. 2 is a block diagram showing a construction of a typical system in which the invention is used.

A description will now be given of a system using the apparatus of the first embodiment. FIG. 2 is a block diagram showing a construction of the typical system. Referring to FIG. 2, the system comprises a client 1, a server 2, a video contents storage unit 3 for storing video contents 111, a decode processing unit 4 for decoding a digitally-compressed bit stream 101 in the video content 111 stored in the video contents storage unit 3 so as to output a video signal 102.

Referring to FIG. 2, the system further comprises a feature coding unit 5 for receiving the video signal 102 produced as a result of decoding by the decode processing unit 4, and generating a feature stream 103; a user interface (I/F) 6 for controlling the feature coding unit 5 in accordance with a user instruction/setting 104; and a feature stream storage unit 7 for storing the feature stream 103 generated by the feature coding unit 5. The video contents storage unit 3 and the feature stream storage unit 7 are provided at separate locations in the server 2. Alternatively, a single storage unit may store the video contents and the feature streams.

The client 1 comprises a user interface (I/F) 8 for outputting a search control signal 106 for controlling the client 1, in accordance with a user instruction/setting 105; a search processing unit 9 for receiving the search control signal 106 and outputting a search instruction 107 and a search key 108.

Referring to FIG. 2, the system further comprises a feature decoding unit 10 for decoding the feature stream 103 stored in the feature stream storage unit 7 and outputting a decoded feature 109, in accordance with the search instruction 107 from the search processing unit 9; a feature identifying unit 11 for checking the search key 108 received from the search processing unit 9 against the decoded feature 109 received from the feature decoding unit 10, and for outputting a pointer 110 indicating a feature stream identification number. Reference numeral 111 indicates the video content output from the video contents storage unit 3 in accordance with the pointer 110 output from the feature identifying unit 11.

A description will now be given of the operation according to the first embodiment.

The system shown in FIG. 2 enables the user to search for and browse the desired video content 111, based on the feature stream 103 corresponding to the video content 111 stored in the video contents storage unit 3. For the purpose of illustration, a server and client model is assumed. The search system is assumed to be a client 1 and the contents storage and transmission system is assumed to be a server 2.

The client 1 and the server 2 may be connected to each other via the network for operation. Alternatively, the client 1 and the server 2 may operate within the same unit. FIG. 2 does not show the operation over the network. In the following description, operations required for network processes will be described as the need arises.

(1) Significance of Feature Stream

Figure 3:
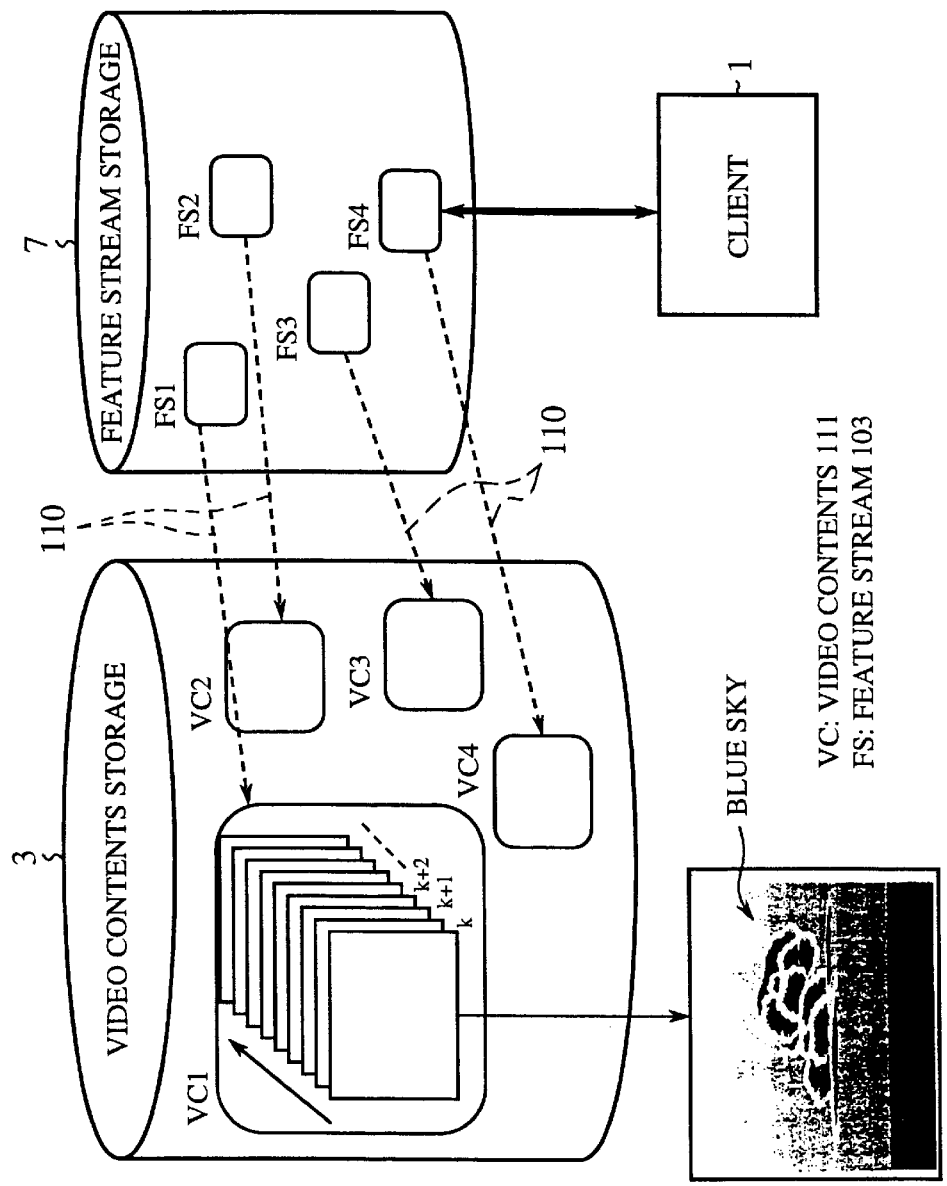
FIG. 3 shows correspondence between a video content and a feature stream.

FIG. 3 illustrates correspondence between the video content (VC) 111 and the feature stream (FS) 103. An identification number is attached to the video content 111 and the feature stream 103. FSn indicates a feature stream 103 which is a description of the feature of the video contents VCn. The video content VCn and the feature stream FSn are related to each other by the pointer 110.

As shown in FIG. 3, assuming that a "blue sky" is contained in the kth frame of the VC1, a description, which describes that the kth frame of VC1 contains an area in which blue is a dominant (representative) color and which occupies 80% of the frame, is provided in FS1. Hereinafter, an area characterized by a feature is referred to as a segment. By requesting via the client 1 of FIG. 2 a segment in which a representative color is blue and which occupies 80% of a frame, the feature stream 103 is searched for a corresponding feature so that the video content 111 containing the matching frame is retrieved. A feature may be defined as any of various attributes including representative color, on-screen position, shape, variation in position (movement), variation in brightness or color, and contrast. Of course, the user is given options in how they specify a feature. By providing the search processing unit 9 of the client 1 with a proper analyzing function, the user can place a request in an intuitive manner.

By describing the feature of the video content (VCn) 111 in the feature-stream (FSn) 103, the user can retrieve the desired video content 111 from a large repository of the video contents 111, using an intuitive search key 108. The search method according to the first embodiment improves the efficiency of the process of retrieving the desired video content 111 from a video library database or a video tape that contains a large volume of video contents 111.

(2) Generation of a Feature Stream

Generation of the feature stream 103 means generating the feature stream (FSn) 103 corresponding to the video content (VCn) 111 and storing it in the feature stream storage unit 7. These steps are carried out by the decode processing unit 4, the feature coding unit 5 and the user interface 6. The decode processing unit 4 is necessary only when the video content (VCn) 111 is stored in the form of the digitally compressed bit stream 101. The decode processing unit 4 outputs the video signal 102. When the video content (VCn) 111 is image data directly displayable, the decode processing unit 4 is not necessary.

The feature coding unit 5 generates the feature stream (FSn) based on the video signal 102 and stores it in the feature stream storage unit 7. Generation of the feature stream 103 will be discussed in detail later.

(3) Search Process

The search process is initiated by the client 1. The client 1 is, a processing unit which the user uses to search for the desired video content 111 from a repository of video contents 111 in the video contents storage unit 3. The user supplies via the user interface 8 the user instruction/setting 105 to generate the search control signal 106. The search control signal 106 is then supplied to the search processing unit 9 to request the target coded feature in the feature stream 103.

FIG. 3 is referred to to describe an illustrative search which requests the video content (VCn) 111 containing a "blue sky" from the entirety of the video contents (VCn) 111. In this search process, the entirety of the feature stream (FSn) 103 is screened for the feature indicating "blue sky" so as to identify the video content (VCn) 111 that corresponds to the feature stream (FSn) 103 containing that feature. The search processing unit 9 refers to the search control signal 106 to determine the feature to be requested, so as to output the search key 108 and activate the search instruction 107.

Assuming that the client 1 and the server 2 are connected to each other via the network, the search instruction 107 and the search key 108 are transmitted to the server 2 and the apparatus for feature identification (the feature decoding unit 10 and the feature identifying unit 11).

When the search instruction 107 is activated, the feature decoding unit 10 successively retrieves the feature stream (FSn) 103 from the feature stream storage unit 7 so as to decode the feature contained in the feature stream 103. The decoded feature 109 obtained as a result of decoding is checked against the search key 108 by the feature identifying unit 11. When the decoded feature 109 that matches the search key 108 is identified, the pointer 110 of the feature stream 103 containing the matching feature is referred to, so as to identify the video content (VCn) 111. In the example of FIG. 3, "blue sky" is contained only in the video content VC1. Therefore, the decoded feature 109 that matches the search key 108 is identified in a segment constituting the kth frame of the feature stream FS1. The kth frame of the video content VC1 is output as a search result.

The apparatus for feature identification (the feature decoding unit 10 and the feature identifying unit 11) may be included in the client 1 or the server 2. Alternatively, the apparatus for feature identification may be included in another apparatus located in the network. When the client 1 and the server 2 are housed in the same unit, the apparatus for feature identification may be housed in that unit.

The video content 111 output as the search result are transmitted to the client 1 so that the user can browse the image contents via the user interface 8. When a plurality of video contents 111 are identified as a result of the search with respect to the feature "blue sky", the plurality of video contents 111 may be browsed by displaying them via the user interface 8. With this system, the user need not browse the entirety of the video contents 111 but can narrow the field of browsing by displaying only those video contents 111 that include a desired segment. Accordingly, the efficiency of a search is improved.

(4) Interactive Function

In the system of FIG. 2, the process of generating the feature stream 103 can be controlled by the user. More specifically, when generating the feature stream 103 from the video signal 102, the feature coding unit 5 may refer to the user instruction/setting 104 provided via the user interface 6 so as to set various conditions for defining segments in the video contents (VCn) 111, add and delete segments, or set in-frame positions that define segments.

(5) Transmission and Distribution of Feature Stream

The feature stream (FSn) 103 does not have to be stored in the server 2 together with the video contents 111 but may be located anywhere as long as the feature stream 103 is provided with the pointer 110 that points to the corresponding video content (VCn) 111. For example, a CD-ROM may contain only the feature stream 103. By reading from the CD-ROM, the client 1 can identify the location of the video content 111 corresponding to the feature stream 103. In this case, a requirement for the feature stream 103 may be that it has a uniform resource locator (URL) of the video content.

The feature stream 103 generally has a smaller data volume than the video content 111. Accordingly, the feature stream 103 may be stored in a relatively small storage medium so as to be used on a portable terminal such as a notebook personal computer (PC) or a personal digital assistant (PDA).

The feature stream 103 may be attached to the video contents 111 and transmitted and distributed over the network. With the interactive function described in (4) above, a receiver of the feature stream 103 may process or edit the received feature stream 103 either for reuse or for retransmission. The video contents 111 may be freely distributed among different types of medium without losing the flexibility in searching.

A detailed description will now be given of generation of the feature stream 103.

Figure 4:
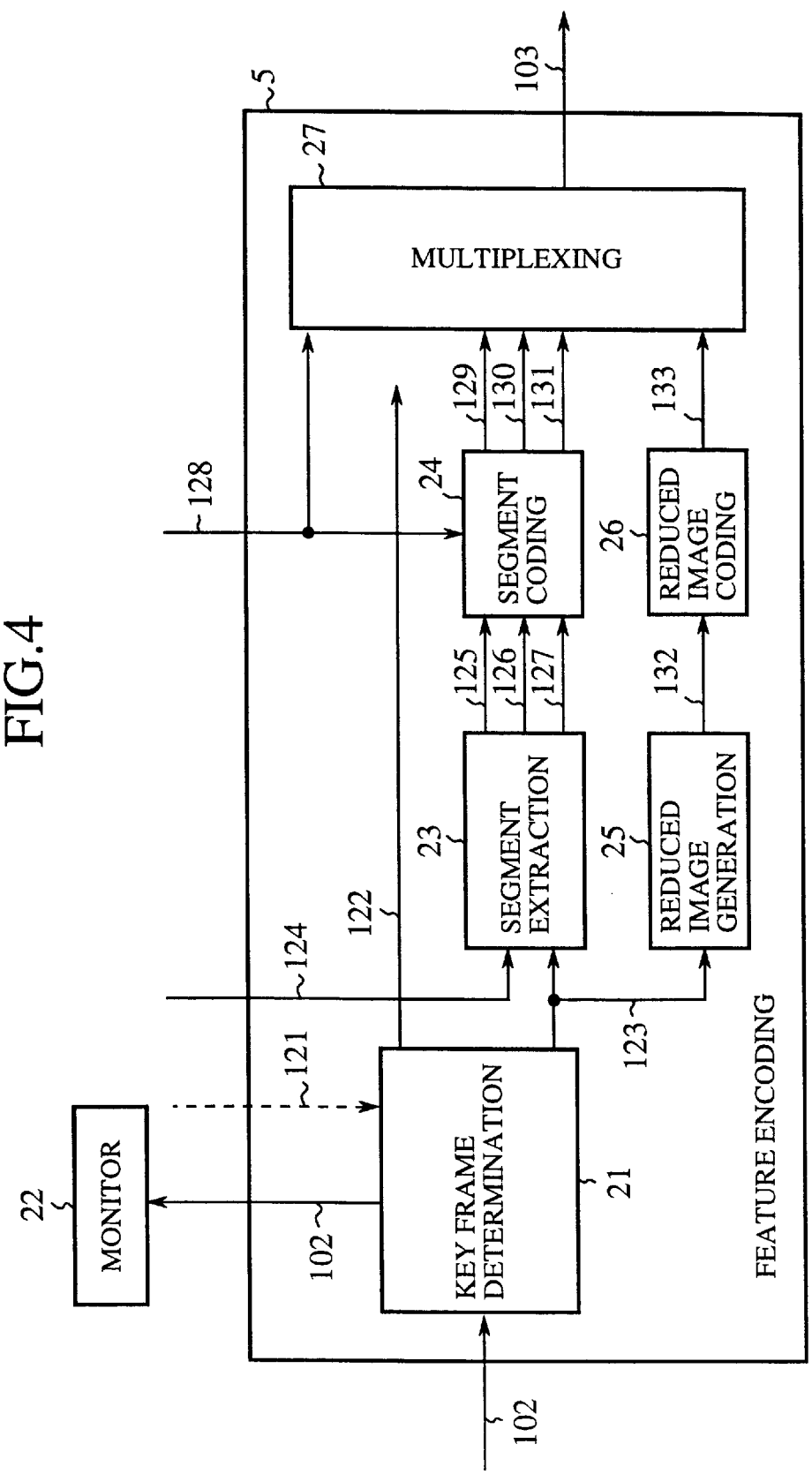
FIG. 4 is a block diagram showing an internal construction of a feature coding unit according to a first embodiment of the present invention.

As described above, generation of the feature stream 103 is carried out by the feature coding unit 5. FIG. 4 is a block diagram showing an internal construction of the feature coding unit 5 according to the first embodiment. Referring to FIG. 4, the feature coding unit 5 comprises a key frame determining unit 21 for receiving the video signal 102, determining a key frame in accordance with a key frame setting signal 121, and outputting a key frame number 122 and a key frame 123; and a monitor 22 for monitoring the video signal 102 from the key frame determining unit 21.

Referring again to FIG. 4, the feature coding unit 5 further comprises a segment extracting unit 23 for extracting the segment from the key frame 123 determined by the key frame determining unit 21 and outputting a representative color 125 and a segment number 126 of the segment. In addition, the segment extracting unit 23 outputs size information 127 of the segment in response to a key frame size 124 output in decoding the video content 111.

Referring again to FIG. 4, the feature coding unit 5 comprises a segment coding unit 24 for referring to a color map table 128 so as to code the representative color 125 provided by the segment extracting unit 23, outputting a representative color 129 of the coded segment, coding the segment number 126 and the size information 127, and outputting the coded segment number 130 and the coded size information 131.

Referring again to FIG. 4, the feature coding unit 5 comprises a reduced image generating unit 25 for creating a reduced image from the key frame image 123 so as to output reduced image data 132; and a reduced image coding unit 26 for coding the reduced image data 132 and outputting coded reduced image data 133.

Referring again to FIG. 4, the feature coding unit 5 comprises a multiplexing unit 27 for multiplexing a color map table 128, the coded representative color 129, the coded segment number 130, the coded size information 131, and the coded reduced image data 133.

A description will now be given of an operation of the feature coding unit 5.

Figure 5:
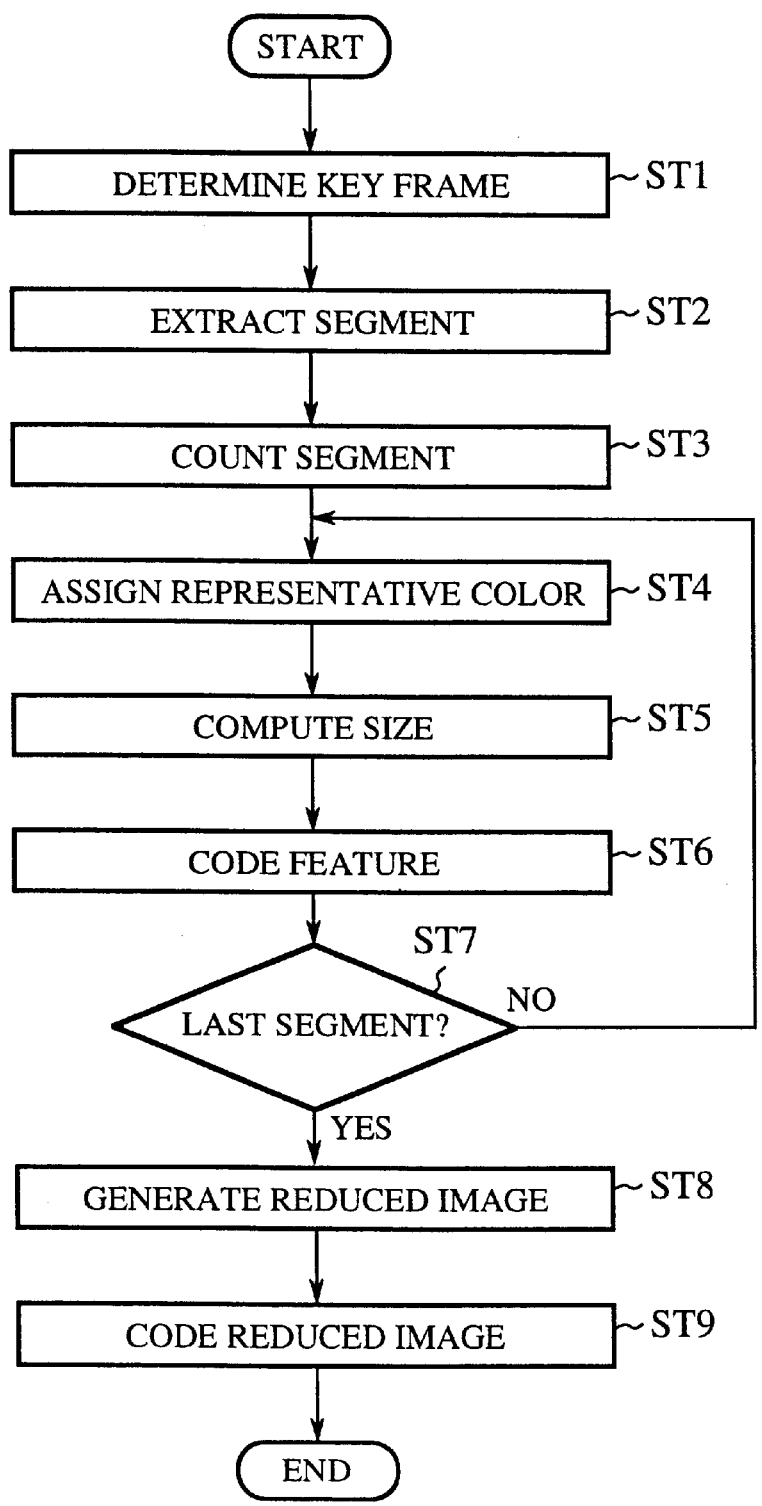
FIG. 5 is a flowchart showing an operation of the feature coding unit according to the first embodiment.

FIG. 5 is a flowchart showing an operation of the feature coding unit 5 according to the first embodiment.

(A) Determination of Key Frame

The key frame determining unit 21 determines a key frame, which servers as a key in the video content 111 (step ST1). The key frame is defined as a frame containing a substantial change (scene change) in the video content 111 or a frame which the user would like to define as a reference point in a search for a specific feature.

Figure 1:
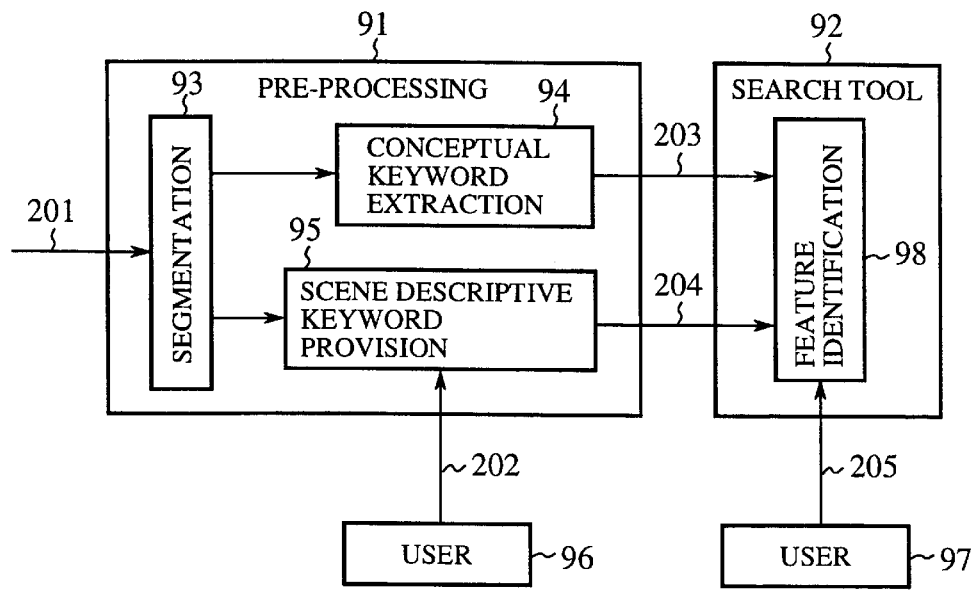
FIG. 1 is a block diagram of an image search system according to the related art.
Figure 6:
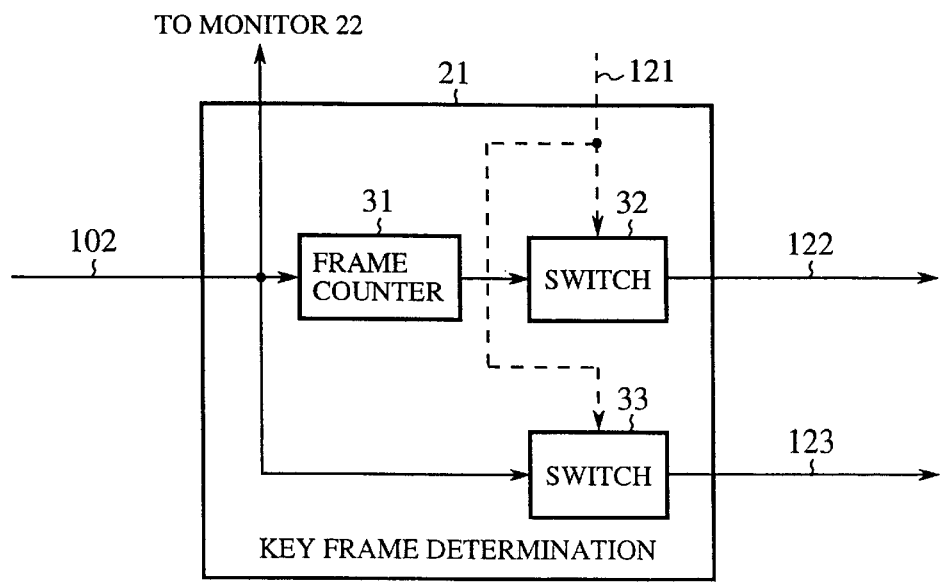
FIG. 6 is a block diagram showing an internal construction of a key frame determining unit of FIG. 4.

FIG. 6 is a block diagram showing an internal construction of the key frame determining unit 21 of FIG. 4. Referring to FIG. 6, the key frame determining unit 21 comprises a frame counter 31 for counting a frame number of the video signal 102; a switch 32 for outputting a key frame number 122 in accordance with a key frame setting signal 121; and a switch 33 for outputting a key frame image 123 in accordance with the key frame setting signal 121. Referring again to FIG. 6, the user specifies a desired key frame while monitoring the video signal 102 using the monitor 22.

The video signal 102 is supplied to the key frame determining unit 21 frame by frame. The frame counter 31 counts the frame number. The frame counter 31 is reset to zero at the start of the video signal 102.

The video signal 102 is also sent to the monitor 22. The user selects a key frame while monitoring the video signal 102 using the monitor 22. An instruction For selection is provided by activating the key frame setting signal 121. By activating the key frame setting signal 121, the switch 32 outputs the key frame number 122, and the switch 33 outputs the key frame image 123 of the selected key frame.

Figure 7:
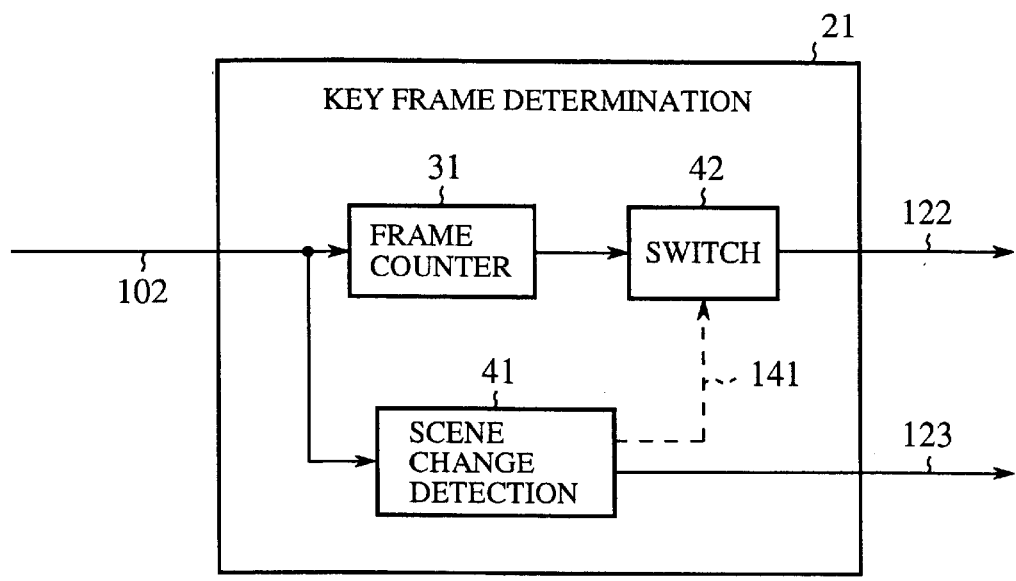
FIG. 7 is a block diagram showing another internal construction of the key frame determining unit of FIG. 4.

FIG. 7 is a block diagram showing another internal construction of the key frame determining unit 21 of FIG. 4. Referring to FIG. 7, the key frame determining unit 21 comprises a scene change detecting unit 41 for detecting a scene change in the video signal 102 and outputting the key frame image 123 and the key frame setting signal 141; and a switch 42 for outputting the key frame number 122 in accordance with the key frame setting signal 141. The frame counter 31 may have the same construction as the frame counter of FIG. 6. It is assumed here that the key frame is located at a point of scene change and the key frame determining unit 21 is provided with the scene change detecting unit 41.

The video signal 102 is supplied to the frame counter 31, as in the key frame determining unit 21 shown in FIG. 6, so that the frame number is counted. The video signal 102 is also supplied to the scene change detecting unit 41 so that the scene change is detected. Detecting of the scene change may be performed according to a related art known, for example, from Nagasaka, Miyatake and Ueda "Realtime Video Scene Detection based on Shot Sequence Encoding", Denshi Jouhou Tsuushin Gakkai Rombunshi D-II Vol. J79-D-II No. 4, pp.531–537. Specific algorithms for detection are not the subject matter of the present invention.

When the scene change is detected, the key frame setting instruction 141 is activated so that the switch 42 outputs the current frame count as the key frame number 122. The scene change detecting unit 41 outputs the detected frame of scene change as the key frame image 123.

An intra-frame coding frame (not shown) that occurs at a predetermined period may be used as a key frame. For example, MPEG-1, MPEG-2 and MPEG-4 (MPEG stands for Moving Picture Experts Group) are known to have the intra frame coding mode in which the frame is coded without using the inter-frame prediction. The intra-frame coding frame is periodically inserted in the video contents 111 while the video contents 111 is being coded so that the inserted frames may be used as reference points of random access. For this reason, the infra-frame coding frame meets the requirement of the key frame.

(B) Detection of Segment

When the key frame image 123 is selected, the segment.extracting unit 23 of FIG. 4 extracts segments contained in the key frame image 123. A segment is defined as a specified area in the key frame, or an area in the key frame corresponding to an object captured in the video content 111.

Figure 8:
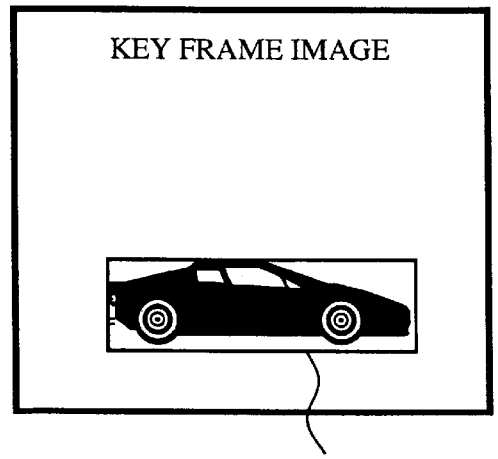
FIG. 8 shows a segment.

FIG. 8 shows a segment. Referring to FIG. 8,when a red car is captured in a plurality of frames in the video content 111, the red car is the object and the segment is an object area (indicated by a rectangle circumscribing the car) that appears in the key frame image 123. The segment in this case is associated with two types of features: the representative color and the size information (a relative area of the segment with respect to the entirety of the frame).

By describing the representative color of the segment in the feature stream 103, the user can retrieve the key frame that matches the requirement substantially automatically, by matching the value in the feature stream 103 and target value for the search. For example, the user can search for the video content 111 containing a "red segment" or a "blue segment".

Since the size information indicates the relative area of the segment with respect to the key frame, the size information is also referred to as representing an important aspect of the segment in the key frame. For example, by specifying "a segment substantially filling the screen in size and having a color of human skin", the key frame containing an image of a face filling the screen may be substantially automatically retrieved. The size information may also include position information relating to a position that serve as a reference of measurement such as the top left corner of a rectangle or relating to a center of gravity of the rectangle.

Figure 9:
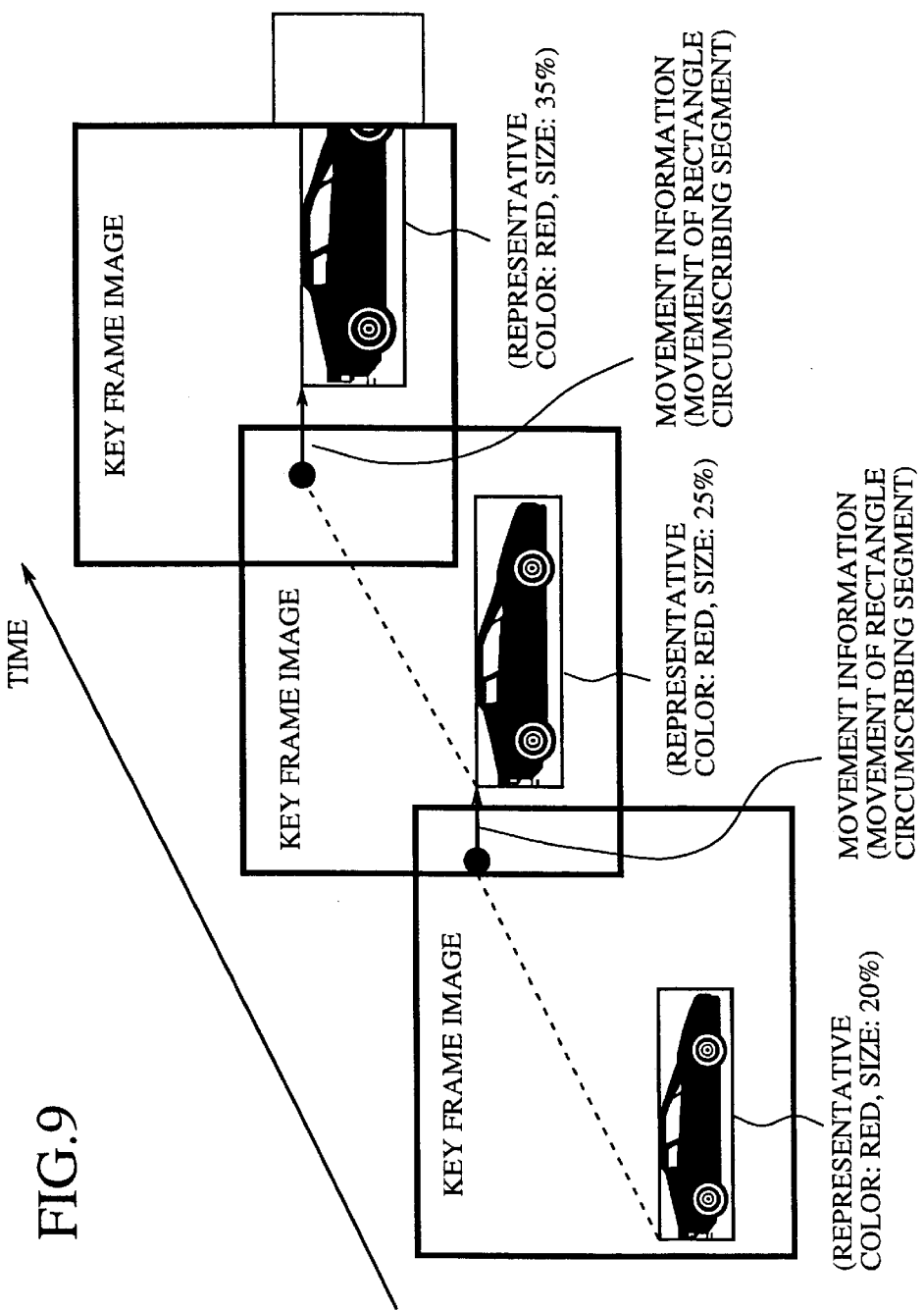
FIG. 9 shows how segments are positioned in a video sequence.

FIG. 9 shows how segments are positioned in a video sequence. FIG. 9 shows how the red car, the object, comes zooming in from the left of the screen and moves toward the right of the screen along a timeline. The feature pattern of the segment varies from key frame to key frame. In FIG. 9, in addition to the feature, such as that of FIG. 8, of each of the key frames, other information is available. That is, a time-dependent feature is available in the form of the movement of the top left corner (segment position) of the segment containing the moving object. With this, the searching for the "object moving from left to right in the screen" is made possible.

For example, a video object defined in the MPEG-4 video coding system (ISO/IEC, JTC1/SC29/WG11, N2202) may be considered as the object according to the definition given above. In this case, the segment corresponds to a video object plane (VOP) of the MPEG-4 video. Strictly speaking, the definition given to the video object plane in the MPEG-4 standard does not match those given to the segment according to the present invention. Conceptually, however, the horizontal and vertical sizes of the video object correspond to the horizontal and vertical sizes of the segment. In contrast, MPEG-1 and MPEG-2 lack the concept of object, the segment being determined only when extraction is made in the key frame.

Figure 10:
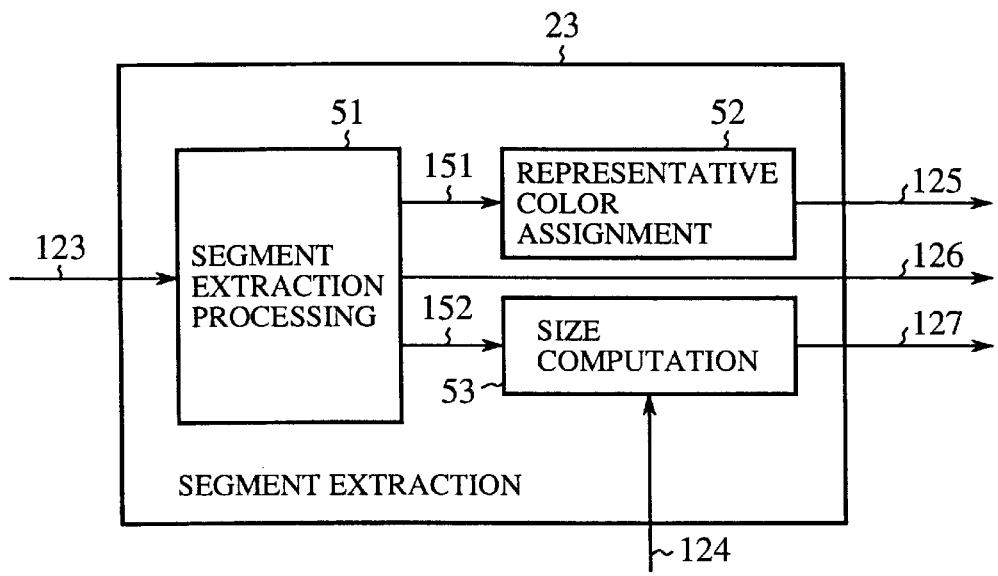
FIG. 10 is a block diagram showing an internal construction of a segment extracting unit of FIG. 4.

Segment extraction is a process whereby a segment is extracted from the key frame image 123 so that its feature is determined and captured. The segment extraction is performed by the segment extracting unit 23 of FIG. 4. FIG. 10 is a block diagram showing an internal construction of the segment extracting unit 23 of FIG. 4. Referring to FIG. 10, the segment extracting unit 23 comprises a segment extraction processing unit 51 for receiving the key frame image 123 and outputting the segment number 126, a intra-segment image sample value 151, horizontal and vertical sizes (pixels×lines) 152 of the segment defined by a rectangle; a representative color assigning unit 52 for assigning a representative color 125 to the segment in accordance with the intra-segment image sample value 151; and a size computing unit 53 for computing the size 127 indicated by the relative area, in accordance with the horizontal and vertical sizes 152 of the segment and the key frame size 124.

The segment extraction processing unit 51 of the segment extracting unit 23 of FIG. 10 extracts the segment from the key frame image 123, using a known area extracting process (step ST2 of FIG. 5). In this example, it is assumed that the segment and the object are not related to each other by a precisely defined relationship. That is, in this example, the segment is only a specific image area in the key frame. Segments are not provided with means to relate one segment from one key frame to another segment from another key frame, with reference to objects therein. The segment is defined as an independent entity from key frame to key frame.

Extraction of the segment may be performed by clustering whereby similar colors are collected in a color component space. The invention does not, however, concern with specific implementations of the extraction process. It is simply assumed that the segment extraction processing unit 51 produces the segment in the form of an image area which contains a distinctive content and which is circumscribed by a rectangle.

The segment extraction processing unit 51 counts image areas (segments) thus extracted by assigning a number to each segment. The count is output as the segment number 126 (step ST3).

The segment extraction processing unit 51 outputs the intra-segment image sample value 151 to the representative color assigning unit 52 so that the representative color assigning unit 52 determines the representative color 125 (step ST4). For example, in the case where the intra-segment image sample value 151 is formatted as RGB representation with eight bits assigned to R, G and B, respectively, R, G, B averages of the R, G, B spaces of the segment are computed so that a set of R, G, B averages is assigned as the representative color. Alternatively, pixels that are included in a representative area in the segment are specified so that the average is computed in that area.

Assuming that the VOP of MPEG-4 corresponds to the segment according to the invention, an area representing the segment is determined on the basis of the alpha plane which depicts the configuration of the VOP. FIG. 11 shows a video plane object (VOP) of MPEG-4 and illustrates a relation between the VOP pixel data and the alpha plane. As shown in FIG. 11, the alpha plane is a plane consisting of binary values, produced by assigning 255 to a pixel in the rectangle circumscribing the VOP resides within the object, and 0 to a pixel resides outside the object. The border between 0 and 255 denotes the configuration of the VOP. This means that only those pixels that are associated with the value of 255 on the alpha plane may be processed to determine the representative color.

An alternative method of determining the representative color is for the segment extraction processing unit 51 to extract the segment on the basis of the color information so that the color information assigned to the segment as a result of clustering is used to determine the representative color.

Referring to FIG. 10, the segment extraction processing unit 51 outputs the horizontal and vertical sizes (pixels× lines) 152 of the segment defined by a rectangle, to the size computing unit 53. The size computing unit 53 computes the relative area of the segment with respect to the frame, using the horizontal and vertical sizes 124 of the key frame input separately. The size computing unit 53 outputs the resultant relative size as the size 127 (step ST5). For example, when the segment has the horizontal and vertical sizes 152 of 176 pixels×144 lines and the sizes 124 of the key frame is 352 pixels×288 lines, the relative area (size 127) yielded by the size computing unit 53 is 25%.

(C) Coding of Segment

Referring to FIG. 4, the feature (representative color 125, segment number 126, sizes 127) obtained by the segment extracting unit 23 is supplied to the segment coding unit 24 so that the multiplexing unit 27 turns the feature into the format of the feature stream 103 (step ST6).

Figure 12:
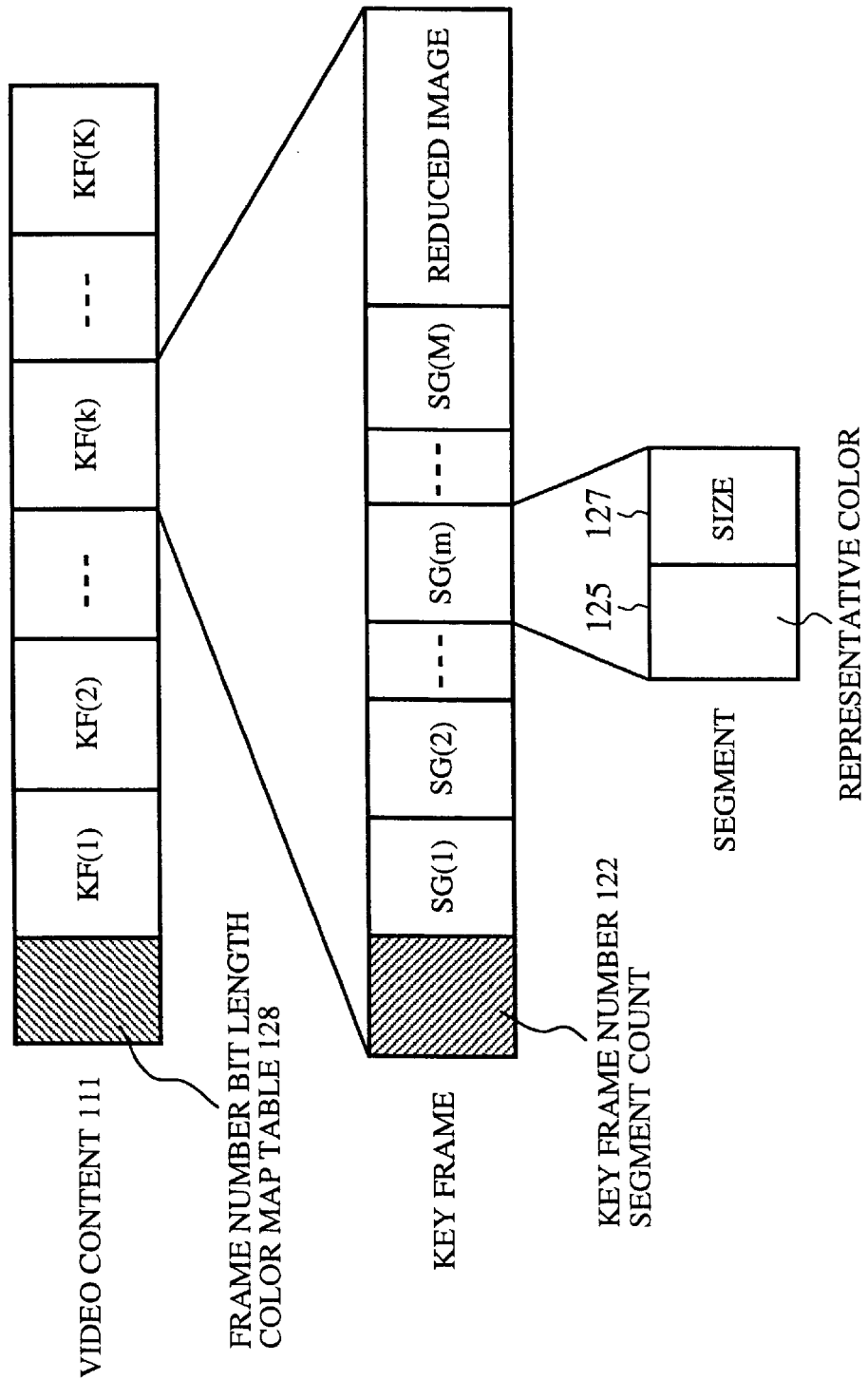
FIG. 12 shows a construction of a feature stream produced by a feature coding unit using the segment extraction unit of FIG. 10.

FIG. 12 shows the feature stream 103 produced by the feature coding unit 5 when the segment extracting unit 23 of FIG. 10 is used. The feature stream 103 has a nested structure wherein the video content 111 includes key frames, which in turn includes segments. A header of the video content 111 includes information specific to the video content, such as the frame number bit length and the color map table 128. A total of K key frames are provided subsequent to the header. The sequential positions (key frame number 122) of the key frames are included in the header of each key frame by multiplexing. For this purpose, the bit length capable of indicating the maximum frame count is included in the header of the video content 111. The color map table 128 for defining the color gradation used in the video content 111 to code the representative color of the segments is also included in the header.

The kth key frame, indicated as KF(k) hereinafter, has a header which includes the sequential position (key frame number 122) in the video contents 111 and the number of segments (M) found in the screen. A total of M sets of segment data are provided subsequent to the header. The key frame KF(k) also includes data for a reduced image described later for the browsing purpose. The mth segment, indicated as SG(m) hereinafter, consists of the representative color 125 and the size 127. The representative color 125 is given by coding an index value in the color map table 128.

Figure 13:
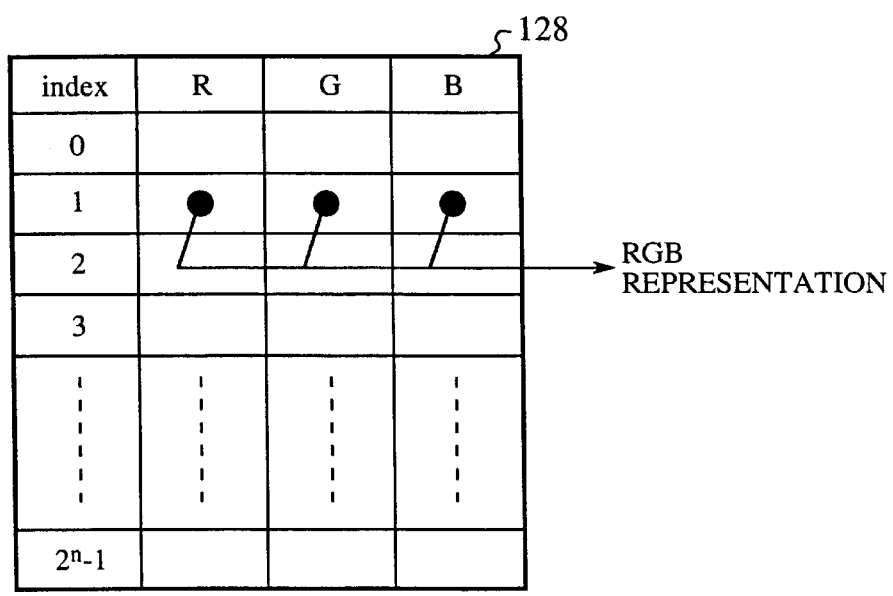
FIG. 13 shows an example of color mapping table.

FIG. 13 shows the color map table 128 according to an exemplary implementation. The color map table 128 of FIG. 13 is derived from the X-Windows system. However, other formats of the color map table 128 are also conceivable. Definition of the data format listed in the color map table 128 is not the subject matter of the invention.

An index color is made to correspond to a set of R, G, B values. By increasing the number (n) of index colors, the gradation becomes richer.

The size 127 indicates a relative area in percentage given by a figure between 1 to 100 and requires seven bits at most.

Referring back to FIG. 4, the coded feature data produced by the segment coding unit 24 is transmitted to the multiplexing unit 27 and appended to the feature stream 103 shown in FIG. 12. Extraction of the segment feature by the segment extracting unit 23 and coding by the segment coding unit 24 are repeated commensurate with the number of the segments identified in the key frame (step ST7 of FIG. 5).

(D) Generation of Reduced Image

Referring back to FIG. 4, the reduced image generating unit 25, the reduced image coding unit 26 are provided for the purpose of appending the schematic image of the key frame (hereinafter, referred to as thumbnail or thumbnail image) to the feature stream 103 as indicating the feature of the key frame. By attaching the icon-like thumbnail image to the key frame, the user need not reproduce the key frame image by directly decoding the digitally compressed content. Thereby, the efficiency of browsing is improved.

A reduced image is produced by determining an average value for each of the N×N pixels of the key frame image 123 (step ST8 of FIG. 5). The value thus determined is coded according to an appropriate coding practice (step ST9).

Referring to FIG. 4, the reduced image generating unit 25 generates reduced image data 132 in the form of the DC value. The reduced image coding unit 26 compresses the reduced image data 132 in the form of the DC value and output coded reduced image data 133.

Since the key frame image 123 is usually produced by decoding a bit stream subject to non-reversible compression, the compression by the reduced image coding unit 26 is preferably a simple coding scheme using low compression, such as differential pulse code modulation (DPCM). By determining the DC value for a set of N×N pixels, the number of samples can be reduced by at least $1/N^2$ so that the feature stream 103 does not incur a load of heavy code volume.

The coded reduced image data 133 is transmitted to the multiplexing unit 27 so as to produce the feature stream 103 having the format of FIG. 12.

As has been described, with the construction of the feature encoding unit 5 according to the first embodiment, the user can generate the feature stream 103 in which the feature of the video content 111 is described. Moreover, the user can specify the key frame in the video content 111 automatically or manually. The feature is set in the image area (segment) found in each key frame, in the form of the representative color 125, the size 127 and the like. By using the feature as the search key, the video content search process can be automated to a certain extent. The candidates yielded as a result of the automatic search may be browsed using thumbnail images so that the efficiency in retrieving the video content is improved.

The definition of a segment according to the first embodiment is derived from considering the frame image as a still image. Therefore, the search process according to the first embodiment is applicable to a search for a desired image in a large library of still images. In the case of still images, the key frame is at the top of the hierarchy depicted in FIG. 12.

Second Embodiment

Figure 14:
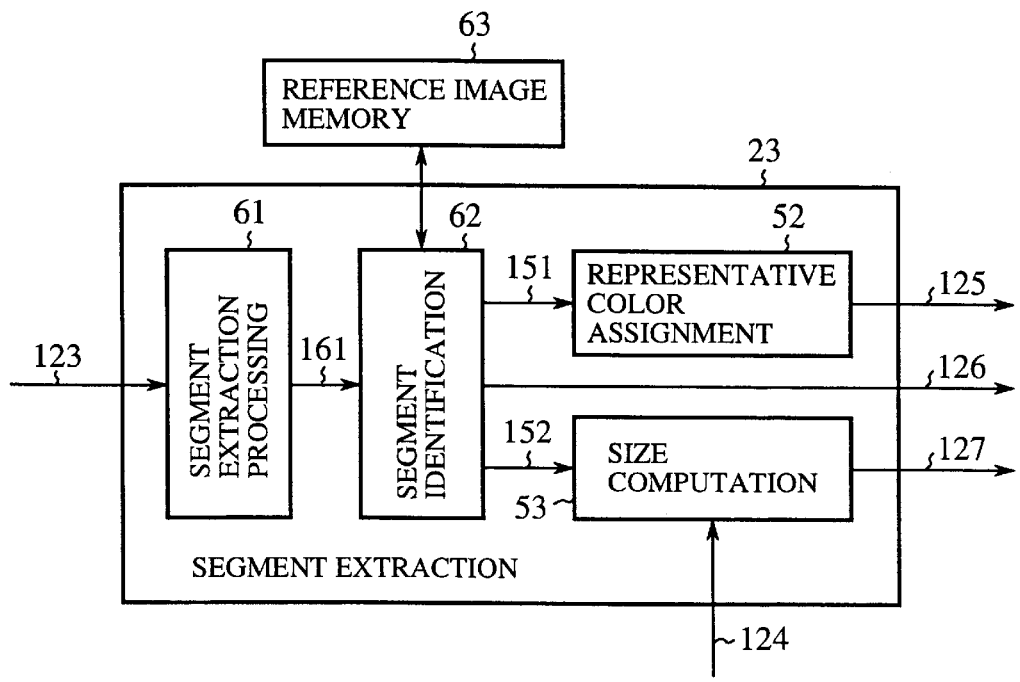
FIG. 14 is a block diagram showing an internal construction of a segment extraction unit according to a second embodiment of the present invention.

FIG. 14 is a block diagram showing an internal construction of the segment extracting unit 23 according to a second embodiment of the present invention. The segment extracting unit 23 comprises a segment extraction processing unit 61 for extracting segment data 161 from the key frame image 123; a segment identification processing unit 62 for checking segments from the key frame image against segments from the existing key frame image 123 stored in a reference image memory 63 for a match so as to give identification to the segments.

In this example, segments from one key frame are checked against segments in other key frames. The segments are associated with objects in the video content. That is, the key frame is not considered as a closed domain as far as the segments therein are concerned. Segments are extracted as image areas in which the objects constituting the video content 111 are captured from moment to moment.

When the segment extraction processing unit 61 extracts the segment data 161 associated with a plurality of segments from the key frame image 123, the segment identification processing unit 62 checks each segment against segments from the existing key frame image 123 stored in the reference image memory 63 for a match so as to give identification to the segments. The segments given the identification are output with the segment number 126 attached, where the segment number 126 is the same as that of the existing matching segment. When a match is not found, the segment is considered as a new segment and is output with new segment number 126.

The segment identification processing unit 62 also outputs the intra-segment image sample value 151 and the horizontal and vertical segment sizes 152. The representative color assigning unit 52 and the size computing unit 53 compute the representative color 125 and the size 127, respectively, as in the construction of FIG. 10.

Figure 15:
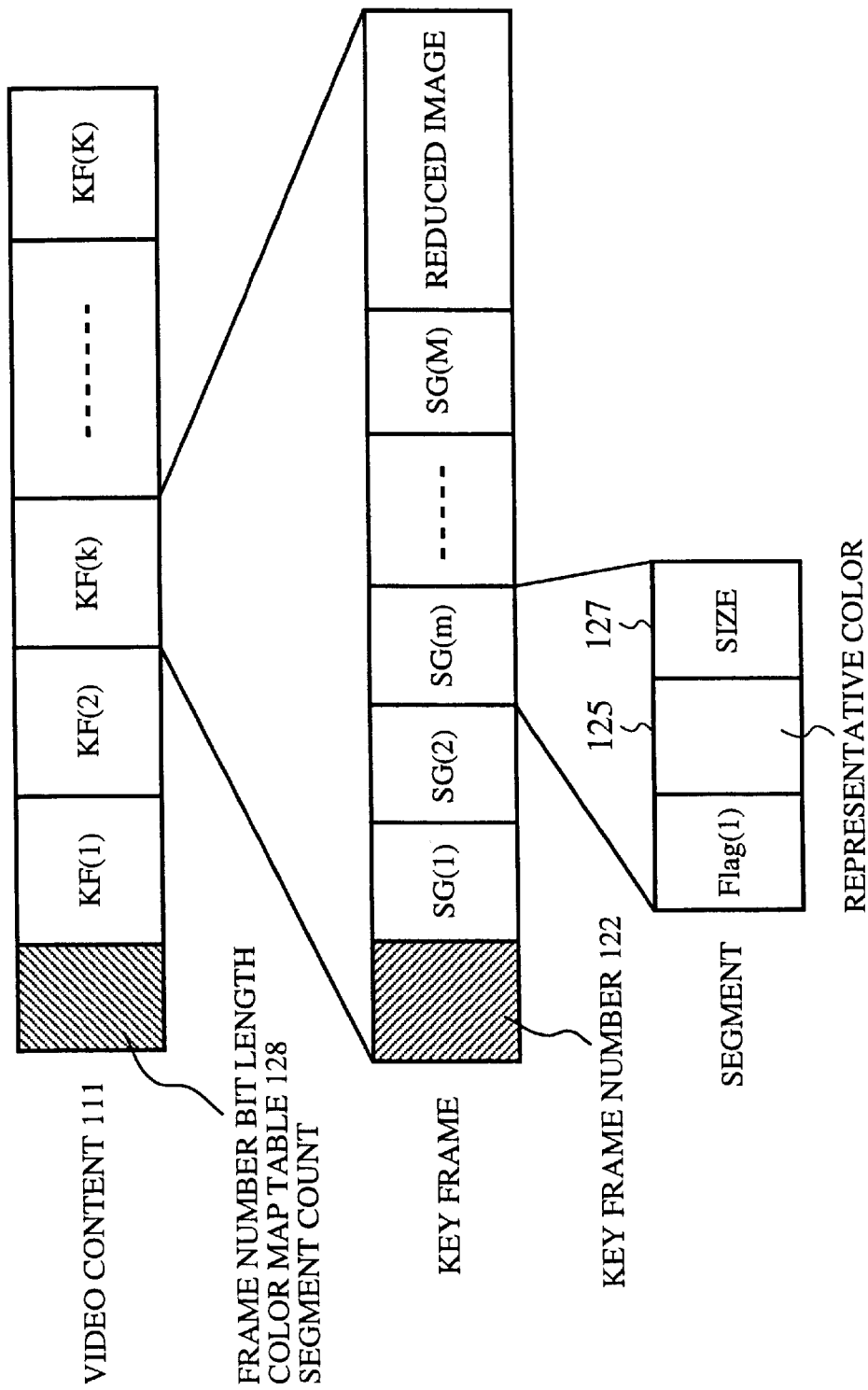
FIG. 15 shows a construction of a feature stream produced by the feature coding unit using the segment extraction unit.

FIG. 15 shows a feature stream 103 produced by the feature coding unit 5, when the segment extracting unit 23 of FIG. 14 is used. In this case, the segments are associated with objects constituting the video content 111 so that the number of segments (M) is placed at the header of the video content 111.

The segment SG(m) is provided with Flag (1). Flag (1) indicates whether the segment SG(m) is found in the key frame KF(k). It is assumed that each key frame has a total of M coded segments at most. When SG(m) is not actually found in KF(k), Flag (1) is turned off so that the representative color 125 and the size 127 are not coded. Flag (1) is attached by the multiplexing unit 27 of FIG. 4.

When SG(m) is found in KF(k) but not in KF(k-1), that is, when SG(m) makes an appearance for the first time in frame k, a unique flag indicating entrance to the scene may be used. When SG(m) is found in KF(k) but not in KF(k+1), that is, SG(m) disappears in frame k, a unique flag indicating exit from the scene maybe used.

The coded feature data thus produced is transmitted to the multiplexing unit 27 so that the feature stream 103 having the format of FIG. 15 is output.

As has been described, with the construction of the segment extracting unit 23 of FIG. 14 according to the second embodiment, segments from a plurality of key frames are related to objects captured in the video content 111 so that the number of segments commensurate with the number of objects are output. Therefore, the user can efficiently search for a target content in the video content 111.

Third Embodiment

Figure 16:
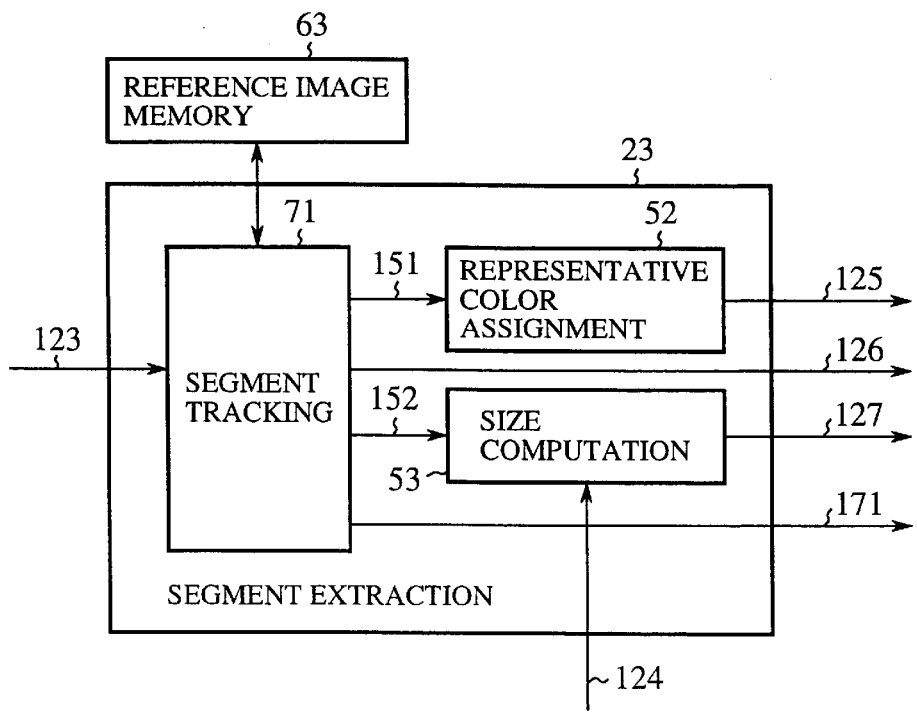
FIG. 16 is block diagram showing an internal construction of the segment extraction unit according to a third embodiment of the present invention.

FIG. 16 is a block diagram showing an internal construction of the segment extracting unit 23 according to a third embodiment. Referring to FIG. 16, the segment extracting unit 23 comprises a segment tracking processing unit 71 for receiving the key frame image 123 and referring to the reference image memory 63, so as to output the segment number 126, the intra-segment image sample value 151, the segment horizontal and vertical sizes 152 and movement information 171. The representative color assigning unit 52 and the size computing unit 53 are the same as the corresponding units of FIG. 14.

In this example, the segment is obtained as an image area found in the key frame as a result of tracking an object in the video content 111. Object tracking is performed by the segment tracking processing unit 71.

Various approaches for object tracing are proposed. Selection of one of these approaches is not the subject matter of the present invention. By using an appropriate algorithm, an object can be tracked even when it disappears and then reappears in the screen.

The segment extracting unit 23 of the third embodiment is no different from the segment extracting unit 23 of FIGS. 10 and 14 in that segments in the key frame image are subject to computation to determine the representative color 125 and the size 127. The segments corresponding to the same object are given the same segment number 126. Movement of the segment is obtained as a result of tracking and is output as the movement information 171.

FIG. 4 does not show that the segment extracting unit 23 outputs the movement information 171. When the segment extracting unit 23 of FIG. 16 is used, however, the movement information 171 is output. The movement information 171 is coded by the segment coding unit 24.

FIG. 17 shows a feature stream 103 produced by the feature coding unit 5 when the segment extracting unit 23 of FIG. 16 is used. A difference between the construction of FIG. 15 and that of FIG. 17 consists in the structure of the segment. In the case of the third embodiment, Flag (2) is provided to indicate whether the segment appears for the first time. The movement information 171 is included, by multiplexing, in the segment having Flag (2) activated.

With this construction, a portion of the video content 111 in which an object appears for the first time includes information relating to the subsequent movement of the object. Thus, for example, the apparatus and method according to the third embodiment can respond quickly to a search key such as "moved from left to right". Although not shown in FIG. 17, the movement information 171 may be attached to each segment in the key frames.

Referring to FIG. 4, the feature coded data produced by the segment coding unit 24 is transmitted to the multiplexing unit 27 and output in the feature stream format of FIG. 17.

As has been described, by providing the movement information 171 according to the third embodiment, objects that changes its position from frame to frame is retrieved properly.

Fourth Embodiment

A description will now be given of a video content 111 search according to a fourth embodiment using the client 1 of FIG. 2. The user provides the user instruction/setting 105 to input a parameter indicating the video content 111 subject to the search, via the user interface 8 of the client 1. Input may be initiated by selection from a plurality of parameters (keywords) prepared by the client 1. Alternatively, a search scheme may be input via the user interface 8.

The parameters prepared by the client 1 may include color information such as "blue" and "red", brightness information, relative area of the segment, shape information (such as "round" or "rectangular") of the segment and position information (such as "top" or "bottom right" of the screen).

By using a combination of parameters that specifies "blue" and "80%", description requesting a "segment with a representative color of blue occupying 80% of the frame screen" is effected. By specifying that a rectangular segment which has a representative color of red and which occupies 20% of the bottom of the screen in the frame, a description indicating the aforementioned red car is effected. A complex search for the video content 111 that includes "red car" and "blue sky" can also be made by combining features of a plurality of segments. When the parameter prepared by the client 1 is selected, the result of selection is output as the search key 108 from the search processing unit 9.

Referring to FIG. 2, the feature decoding unit 10 reads out the feature stream 103 from the feature stream storage unit 7 and subjects the same to decoding, in accordance with the search instruction 107 from the search processing unit 9. The feature decoding unit 10 outputs the decoded feature 109 obtained as a result of decoding. As shown in FIGS. 12, 15 and 17, a plurality of feature measures including the representative color 125, the size 127, the segment count, the key frame number 122 and the reduced image are coded to compress the volume of information. Therefore, the decoding process is necessary in order to ensure that the feature is properly identified.

Figure 18:
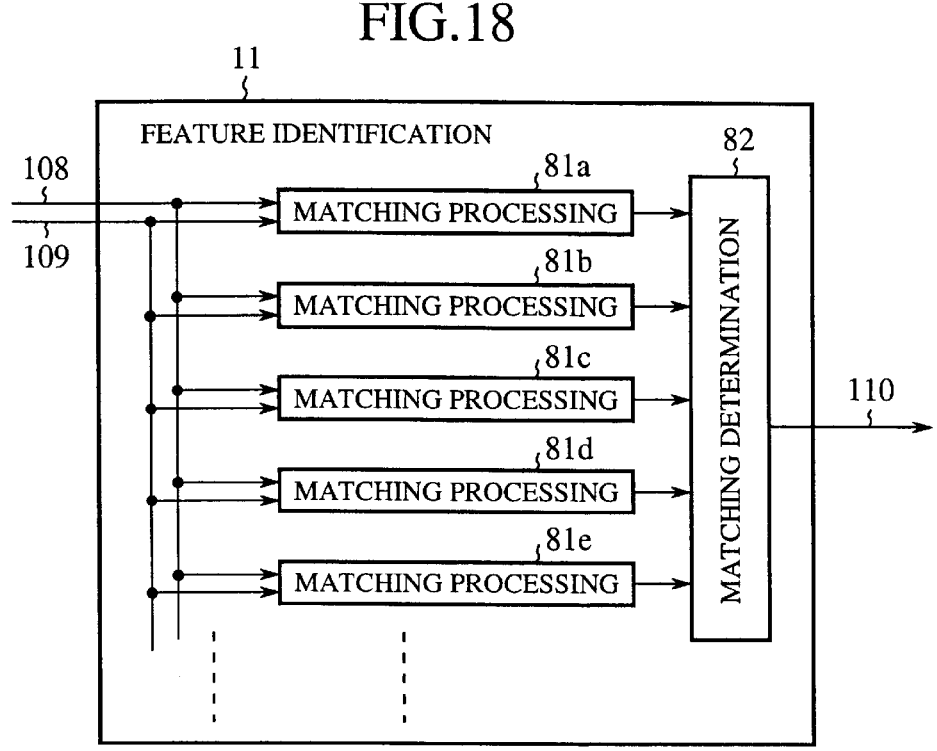
FIG. 18 is a block diagram showing an internal construction of the feature identifying unit according to a fourth embodiment of the present invention.

The decoded feature 109 output from the feature decoding unit 10 is checked against the search key 108 for a match in the feature identifying unit 11. FIG. 18 is a block diagram showing an internal construction of the feature identifying unit 11 according to the fourth embodiment 14. Referring to FIG. 18, the feature identifying unit 11 comprises matching processing units 81a–81e for checking the search key 108 against the decoded feature 109 for a match; and a matching determination unit 82 for examining checking results yielded by the matching processing units 81a–81e so as to output a pointer 110 indicating the target video content 111 that produces the match.

The matching processing units 81a-81e are responsible for respective features. For example, the matching processing unit 81a checks the decoded feature 109 to locate the feature "blue". Likewise, the matching processing unit 81b may check the decoded feature 109 to locate the feature "80%". In this case, an image with the feature "light blue" or "dark blue" may meet the requirement of the user desiring the image with the feature "blue". Also, an image with the feature "70%" or "90%" may meet the requirement of the user desiring the image with the feature "80%". The feature identifying unit 11 not only looks for the perfect match but also considers the feature producing a substantial match with the search key 108 as a candidate feature.

The checking results yielded by the matching processing units 81a-81e are forwarded to the matching determination unit 82, where the degree of matching with respect to the respective features are examined in its entirety. The resultant output from the matching determination unit 82 indicates the degree of matching between the decoded feature 109 and the search key 108 provided as criteria of the search. A threshold value defining a margin for determination of a match may be specified according to a default value standardized in the system. Alternatively, the threshold value may be preset by the user in a manner not shown in the figures.

The feature identifying unit 11 the pointer 110 indicating the video content 111 producing the highest degree of match to the server 2. In response, the server 2 outputs the video content 111 to the client 1.

The client 1 displays the video content 111 via the user interface 8. If the video content 111 is the content desired by the user, the search process is terminated. If not, the user selects parameters so that another search key 108 is generated.

The image data delivered to the client 1 may not be the video content 111 itself stored in the video contents storage unit 3. The delivered image may be the reduced image (thumbnail) in the feature stream 103. By using the thumbnail, the data volume of the video content 111 delivered from the server 2 to the client 1 may be reduced. The size of the screen output via the user interface 8 is limited. Simultaneous display of a plurality of candidate images is possible using thumbnail images. With this, the operability of the search process is improved.

If the video contents storage unit 3 stores a limited amount of images, thumbnail images in the feature steam 103 stored in the feature stream storage unit 7 may be displayed via the user interface 8 as parameters for initiating the search.

As has been described, according to the fourth embodiment, the client 1, the feature decoding unit 10, the feature identifying unit 11, which are involved in the search, allow the user to automatically and efficiently retrieve the video content 111 that is a candidate for the desired video content 111. The data volume of the feature stream 103 is generally smaller than that of the video content 111 so that the process performed by the feature decoding unit 10 is a process with only limited complexity as compared to the expansion/decoding of the video signal 102.

In accordance with the fourth embodiment, when the feature stream 103 includes thumbnail images, a large number of contents from the video content 111 may be simultaneously displayed for browsing. This helps the user to search for a desired image with an increased efficiency.

In the fourth embodiment, it is assumed that the client 1 performs a search process using the system of FIG. 2. The client 1 capable of the search process according to the fourth embodiment may also be capable of searching for desired image data from a library of still images. In this case, the feature stream 103 is not generated for each video content 111 but for each still image.

The feature stream 103 may also be transmitted to a remote place over a network. If the receiving end is provided not only with the search processing unit 9 but also with a feature stream generating function of the feature coding unit 5, the receiving end may rewrite the existing feature stream 103 so as to create the new feature stream 103. Given this capability, the receiving end may exercise a control over the video content by changing a rule governing how the video content 111 is displayed. It is of course possible to construct an apparatus in which the functions of the client 1 and the server 2 are provided.

Fifth Embodiment

Figure 19:
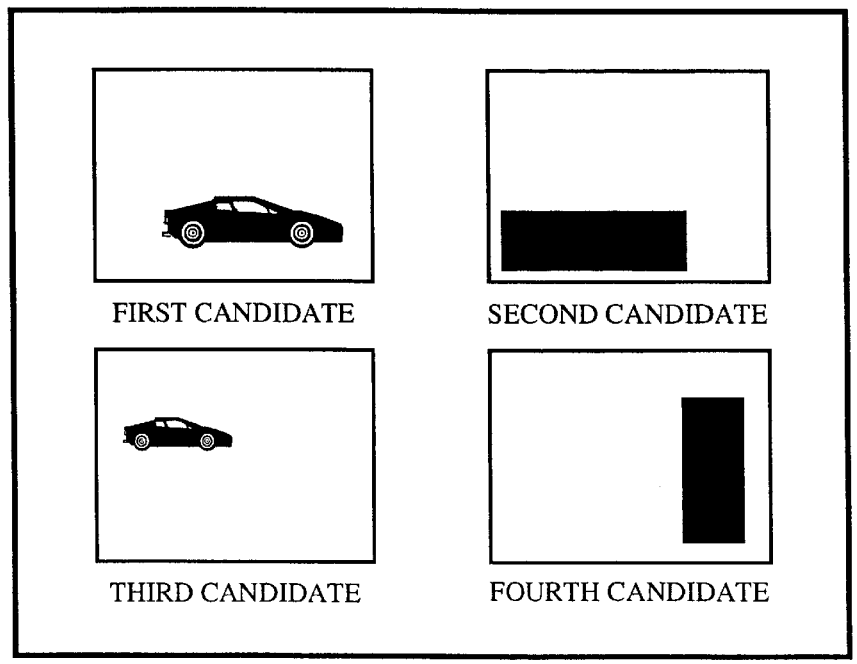
FIG. 19 shows an example of presentation of prioritized search target candidates according to a fifth embodiment of the present invention.

Referring back to FIG. 2, the client 1 may be configured to receive (now shown) information relating to the degree of matching produced as a result of evaluation by the feature identifying unit 11 and to weight candidate images to modify the displayed order and size. With this, the efficiency of the search is improved. FIG. 19 shows an example of presentation of prioritized search target candidates. The retrieved candidate contents are prioritized for presentation to the user in accordance with the degree of matching determined by the feature identifying unit 11.

As has been described, the fifth embodiment is adapted to present prioritized search target candidates so that the user can efficiently search for the content that matches his or her search request.

Sixth Embodiment

A description will now be given of an alternative search criteria input method using the user interface 8 according to a sixth embodiment. The user may input, via the user interface 8, a general outlook of a target image by using, for example, a pointing device such as a mouse to draw a linear figure or color the figure.

As shown in s second candidate segment of FIG. 19, the user may color a relative large bottom portion with red. A segment for a third candidate shows that the user may draw a small red automobile in the left of the screen. A segment for a fourth candidate shows that the user may color a relatively large portion in the right of the screen with blue. Referring to FIG. 2, when the user provides an input on the intuitive basis by inputting a general outlook of a desired image using the user instruction and setting 105, the search processing unit 9 extracts the search key 108 as described below.

The search processing unit 9 divides the input general outlook into individual segments with reference to color information so as to compute an area filled by the color or determine a position of the segment in the screen. As a result of this process, the color information indicating, for example, "blue" or "red", the relative area filled by the color, the configuration of the segment filled by the color, the position of the segment filled by the color are extracted and output as the search key 108.

As has been described, according to the sixth embodiment, by enabling the user to provide an input on the intuitive basis, the video content 111 can be efficiently searched.

Seventh Embodiment

When the movement information 171 of the segment as described in the third embodiment is extracted, it is possible to use the movement information 171 as the search key 108. The user is presented via the user interface 8 with selectable parameters in the form of the movement information 107 such as "from left to right", "from top to bottom" and "zoom in". When a time-dependent variation of the image signal is extracted, parameters such as variation in color and variation in brightness may be presented to the user for selection.

The user may also be allowed to input a general outlook of the image twice, instead of only once, and also input time that elapses between the two images. The search processing unit 9 can extract information relating to the movement of objects and time-dependent variation of the image signal, by referring to the two input images and a time interval therebetween, so as to generate the search key 109.

As has been described, according to the seventh embodiment, the movement information 171 may be used to search for the video content 111 desired by the user.

The present invention is not limited to the above-described embodiments, and variations and modifications may be made without departing from the scope of the present invention.

What is claimed is:

1. An image feature coding method comprising the step of:

extracting segments of image areas from an image frame;

attaching a segment number to each of the extracted segments;

assigning a representative color to each of the extracted segments;

calculating a size of a relative area of each of the segments with respect to the image frame;

coding the representative color and the relative area to produce a feature of the image; and generating a feature stream corresponding to the image having the feature encoded therein.

2. The image feature coding method according to claim 1, wherein the segments are extracted from the image frame in accordance with color information, and the color information used in extracting the segments is assigned to the extracted segments as the representative color.

3. The image feature coding method according to claim 1, wherein the segments from adjacent image frames are checked for identity match, and those segments determined to match each other are given a same segment number.

4. The image coding method according to claim 1, wherein the segments are tracked from image frame to image frame so as to determine movement information relating to the segments that match each other in identity, the movement information is generated by coding to produce the feature of the segments, and the feature stream, having the feature thus produced encoded therein, is generated.

5. The image feature coding method according to claim 1, wherein an appropriate key frame that provides a key for a search is extracted from a group of image frames of a video signal, whereupon the segments are extracted from the extracted key frames.

6. The image feature coding method according to claim 5, wherein a reduced image of the key frame is generated by averaging pixels located in respective areas of the key frame, the reduced image is coded to produce the feature of the key frame, and the feature stream, having the feature thus produced encoded therein, is generated.

7. An image feature coding method comprising the step of:

extracting segments of image areas from an image frame;

attaching a segment number to each of the extracted segments;

assigning a representative color to each of the extracted segments;

computing a relative area of each of the segments with respect to the image frame;

coding the representative color and the relative area to produce a feature of the image; and generating a feature stream corresponding to the image having the feature encoded therein, wherein said feature stream is used to search said image frame via criteria generated by an external input.

* * * * *

UNITED STATES PATENT AND TRADEMARK OFFICE
CERTIFICATE OF CORRECTION

PATENT NO. : 6,611,628 B1 Page 1 of 1
DATED : August 26, 2003
INVENTOR(S) : Sekiguchi et al.

It is certified that error appears in the above-identified patent and that said Letters Patent is hereby corrected as shown below:

Title page,
Item [*] Notice, change "0" to -- 119 --.

Signed and Sealed this

Twenty-fifth Day of May, 2004

JON W. DUDAS
*Acting Director of the United States Patent and Trademark Office*